United States Patent Office 3,454,446
Patented July 8, 1969

3,454,446
METHOD OF ADHESION
Taketami Sakuragi and Yoshio Jyo, Tokyo, and Shinichi Akiyama, Kamakura-shi, and Shoichiro Minami, Yokohama, Japan, assignors to The Japanese Geon Company, Ltd., Tokyo, Japan, a corporation of Japan
No Drawing. Filed June 13, 1966, Ser. No. 556,912
Claims priority, application Japan, June 25, 1965, 40/37,559; Feb. 5, 1966, 41/6,392
Int. Cl. C09j 3/00
U.S. Cl. 156—310                                   10 Claims This invention relates to the method of adhesion in which at least one of the two materials to be adhered to each other is a polyester-type material such as polyethylene terephthalate, a polyamide-type material such as polyhexamethyleneadipamide or a cellulose-type material such as rayon, characterized by the use of a high molecular substance containing as a side chain benzoyloxyalkyl radical or ring-substituted benzoyloxyalkyl radical, as the binding agent.

For example, polyester-type high molecular material of which the most typical is the high molecular material of which main constituent from the standpoint of chemical structure is polyethylene terephthalate, has many practically valuable properties such as toughness, transparency, electrical characteristics, chemical resistance, gas permeability and drawability, and therefore is widely used. On the other hand, however, polyethylene terephthalate-type high molecular materials generally have high degree of crystallinity, and are straight-chain high molecular substances having no functional group, which very much impair the adhesion of polyethylene terephthalate materials either mutually or with other type of material. This is the cause of one drawback in their practical use. As the method of adhering polyethylene terephthalate-type high molecular material various proposals were made up to date such as melt adhesion with heat by means of ultrasonic waves, surface treatment with alkali, acid or flame, or treatment by radiation, or use of rubber, isocyanate-, unsaturated polyester-, or epoxy-type binding agent, and were given trials. However, they are subject to such deficiencies as operational complication or unsatisfactory adhesion strength.

The object of the present invention is, therefore, to provide a binding agent which is entirely novel and furthermore has no drawback from operational as well as economical standpoint.

Other objects of the invention will become apparent from reading the following specification.

We found that a high molecular substance containing as the side chain benzoyloxyalkyl radical or ring-substituted benzoyloxyalkyl radical of which chemical structure can be represented by the formula

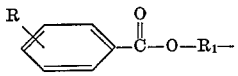

(wherein R stands for hydrogen, a halogen, an alkyl, an alkoxy, a cyano or a nitro radical, and $R_1$ stands for an alkylene radical of two or more carbon atoms which may be substituted by an alkyl radical) has the binding ability meeting the foregoing object.

Chemical structure of polyethylene terephthalate shows that it has the recurring unit of

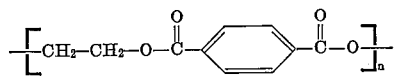

Thus polyethylene terephthalate has crystallinity because the benzene ring of plane structure intruding into the molecular chain of adjacent ethylene glycol imparts regularity to the molecules thereof.

The adhesive high molecular substance of the present invention has the chemical structure partly in common with polyethylene terephthalate, and particularly because the common portion, that is, benzoyloxyalkyl radical, is present as the side chain, the substance readily diffuses into polyethylene terephthalate and can be oriented with polyethylene terephthalate molecule. Presumably this is the cause of the strong adhesion of the said substance. Adhesion of polyethylene terephthalate materials with the novel high molecular substance having the above-mentioned structure is based on a new, unprecedented concept, and has the unique advantage that strong adhesion can be performed with simple operation.

The binder of this invention, the high molecular substance containing as side chain benzoyloxyalkyl radical, may be prepared by plurality of alternative processes, which can be roughly classified into two groups. To wit, they employ either (1) homo- or co-polymerization of such monomer or monomers as will form, upon polymerization, high molecular substances containing as a side chain benzoyloxyalkyl radical, or (2) introduction of benzoyloxyalkyl radical as a side chain into a high molecular substance by means of post-treatment.

For a clearer understanding of the nature of these preparation processes, first the group (1) processes will be explained hereinbelow, taking the example of benzoyloxyalkyl acrylate, inter alia, benzoyloxyethyl acrylate, used as the monomer.

The chemical structure of 2-benzoyloxyethyl acrylate can be expressed as follows:

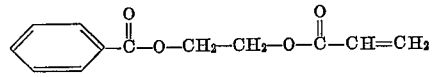

which can be synthesized by converting 2-hydroxyethyl benzoate, i.e., ethylene glycol semi-benzoate, which can be formed by such reactions as direct esterification of benzoic acid with excessive ethylene glycol, demineralization of metal salt of benzoic acid with ethyene halohydrine, ester-interchange between ethylene glycol dibenzoate and ethylene glycol, reaction of benzoic acid with ethylene oxide, or that of benzonitrile with ethylene glycol, to acrylate by the accepted practice. Again in the manner similar to the synthesis of 2-hydroxyethyl benzoate, first 2-hydroxyethyl acrylate may be synthesized, which can be converted to benzoic acid ester by the accepted practice.

Still other processes for synthesizing 2-benzoyloxyethyl acrylate comprises demineralization reaction of 2-haloethyl benzoate which can be obtained by reaction of benzoyl halide with ethylene oxide or from ethylene halohydrine by the accepted practice, with metal salt of acrylic acid. It is also possible to synthesize 2-benzoyloxyethyl acrylate from 2-haloethyl acrylate and metal salt of benzoic acid in entirely similar manner.

Thus synthesized benzoyloxyalkyl acrylates form the desired adhesive high molecular substances through ionic or radical polymerization with ease, in the form of block, solution, emulsion or suspension as any ordinary vinyl-type monomer. Likewise, not only homopolymerization but also copolymerization of benzoyloxyalkyl acrylate is possible with one or more of wide variety of other monomers such as, for example, acrylic acid, alkyl acrylate, glycidyl acrylate, N-methylol-acrylamide, methacrylic acid, alkyl methacrylate, glycidyl methacrylate, hydroxyethyl acrylate, vinylpyridine, styrene, vinyl acetate, vinyl benzoate, butadiene, isoprene, acrylonitrile, etc., to form each corresponding high molecular substance.

Similarly benzoyloxyalkylvinyl ethers, the most typical of which is 2-benzoyloxyethylvinyl ether obtained by reaction of 2-hydroxyethyl benzoate with acetylene or vinyl-exchange reaction between 2-hydroxyethyl benzoate and vinyl ester, can be the monomers to serve the same purpose.

Besides the above-mentioned benzoyloxyalkyl acrylate and benzoyloxyalkylvinyl ether, the following monomers may be named as those useful for the present invention: benzoyloxyalkyloxystyrene, benzoylated vinyl esters of hydroxy fatty acid such as benzoyloxybutyric acid vinyl ester, N-benzoyloxyethyl maleimide, benzoyloxyalkyl methacrylates, benzoyloxyalkyl chloroacrylate, N,N-bis-benzoyloxyethyl acrylamide, benzoyloxyethoxycyclopentene and benzoyloxyethyl monophthalate vinyl ester, etc.

Besides those high molecular substances containing as side chain these benzoyloxyalkyl radicals, high molecular substances containing ring-substituted benzoyloxyalkyl radicals as a side chain similarly possess good binding ability to polyethylene terephthalate. Some of the exemplary monomers used in the latter case include, taking those corresponding to 2-benzoyloxyethyl acrylate which is the most typical monomer used in the former case for example, methoxybenzoyloxyethyl acrylate, halogenated benzoyloxyethyl acrylate, methylbenzoyloxyethyl acrylate, acetoxybenzoyloxyethyl acrylate, benzoyl - benzoyloxyethyl acrylate and carbomethoxybenzoyloxyethyl acrylate, etc.

Now as one example of the aforesaid group (2) processes, the preparation of a ternary copolymer composed of benzoyloxyalkylvinyl ether, butadiene and vinyl chloride will be explained.

To wit, by partial reaction of cis-1,4-polybutadiene rubber with 2-hydroxyethyl benzoate using tertiary butylhypochlorite as the assistant, a ternary copolymer composed of 2-benzoyloxyethylvinyl ether, butadiene and vinyl chloride is obtained according to the reaction formula as below.

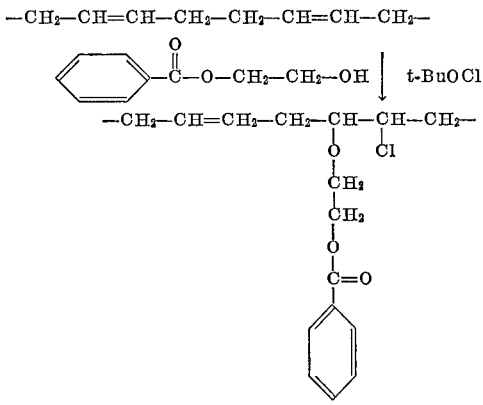

Because the compound as above is also a high molecular substance containing benzoyloxyalkyl radical as the side chain, it shows good adhesion to polyethylene terephthalate. Such a substance is one of the preferred embodiments of the binding agent of this invention, having so-called rubber-like properties.

Another process belonging to the group (2) processes comprises graft polymerization of, for example, benzene or xylene solution of a diene-type elastomer with the addition of, for example, 2-benzoyloxyethyl acrylate, in the presence of a catalyst such as azobisisobutyronitrile. The copolymer thus produced also possesses rubber-like properties.

The adhesive high molecular substances of this invention prepared by the varied processes as above-described can be used as solution-type or solid binder by itself, and furthermore can be mixed or concurrently used with other binders in accordance with the adhesion required as well as the nature of the material to be adhered.

The adhesive high molecular substances of this invention are useful for wide variety of applications attended with adhesion of polyethylene terephthalate-type materials. The main utility thereof includes their use as the binder for polyethylene terephthalate film and shaped article, for polyethylene terephthalate tire cord with rubber, for furplanting in flocking, for non-woven fabrics, for pressure-sensitive tape, for electrical instruments, as well as the vehicle for printing ink and paint.

The entirely novel discovery even surprising to the inventors is that these high molecular substances containing benzoyloxyalkyl radical as a side chain show the binding ability quite satisfactory for practical use to polyamide-type materials represented by polyhexamethyleneadipamide as well as to cellulose-type materials such as rayon.

Therefore, the embodiments of the adhesion with the adhesive substances of the invention include binding of polyethylene terephthalate materials, of polyamide-type materials, of cellulose-type materials, of at least two of the above-mentioned three different type materials, and also that of polyethylene terephthalate-type material, polyamide-type material or cellulose-type material with still other types of materials. The typical of the last-mentioned "other types of materials" include polystyrene, polycarbonate, polyphenylene oxide, polymethacrylate, diallyl phthalate acrylonitrile - butadiene - styrene, melamine - formaldehyde, phenol - formaldehyde, and urea-formaldehyde resins, metal, glass, leather and rubbers, i.e. unvulcanized or vulcanized natural rubber, polybutadiene rubber, styrene-butadiene rubber, acrylonitrile-butadiene rubber and polychloroprene rubber. As the cellulose-type materials other than rayon, wood and cotton may be named.

It is also possible to use the adhesive substances of the invention as mixed, or concurrently, with other known binders, for example, binders based on polyvinyl acetate, synthetic rubber, polyester, urea-formaldehyde, and melamine-formaldehyde. Furthermore, in such a case wherein the aforesaid 2-benzoyloxyethyl acrylate polymer is used as the binder, it is of course possible to apply onto the surfaces to be adhered a mixture of the monomer with the polymerization catalyst and to heat the surfaces so that the adhesion may be completed at the same time with the formation of the polymer.

We further found that, for adhesion of polyester fiber represented by polyethylene terephthalate, polyamide fiber represented by polyhexamethyleneadipamide or cellulose fiber such as rayon, with rubber, use as the assistant binder of free halogen, halogenating agent, halogen-containing polymerizable monomer or isocyanate, in addition to the high molecular substance containing benzoyloxyalkyl radical or ring-substituted benzoyloxyalkyl radical as side chain serving as the binder, produces more effective result. This embodiment of the present invention is particularly valuable for the preparation of rubber products reinforced with fibers, such as tire, rubber belt and rubber hose. The rubber hereinmentioned means such rubber containing an unsaturated bond, which include natural rubber, styrene-butadiene rubber, acrylonitrile-butadiene rubber, polybutadiene rubber, polyisoprene rubber and chloroprene rubber, etc.

Again the free halogen hereinmentioned means halogens excepting fluorine, i.e., chlorine, bromine and iodine, which may be used as dissoved in solvent or water. The halogenating agent means such compounds which releases the above-mentioned halogen upon post-treatment such as heating, which include, as the typical examples, alkylhypohalites such as t-butylhypochlorite and t-butylhypobromite, etc., N-bromosuccinimide and trichloromethanesulfonyl chloride, etc. Also plural compounds which release the aforenamed halogen by their inter-reaction are within the scope of the halogenating agent herein mentioned. Presumably these halogens or halogenating agents halogenate the portion of the rubber which comes into contact with the reinforcing fiber and thereby improve the adhesion. Accordingly it can be understood that such a substance which causes attachment or compounding of halogen-containing compound with rubber product may be effectively used as the assistant in the invention, in place of the free halogen or halogenating agent. Such can be considered as one modification of the adhesion improving method using the halogenating agent. As that type of substances, monomers of the boiling points of no lower than about 30° C., which produce halogen-containing polymers having affinity with rubber upon polymerization, such as chloroprene, bromoprene, 2,3-dichlorobutadiene, α-chloroacrylic acid ester, α-chloroacrylonitrile and hexachlorocyclopentadiene, etc. may be named.

Other assistants which show the similar adhesion improving effect in accordance with the invention include isocyanate compounds, i.e., free mono-, di-, or polyisocyanates such as phenyl isocyanate, tolylene diisocyanate and diphenylmethane diisocyanate, and such substances which form isocyanate within the system upon post-treatment such as heating. The last-mentioned substances which form isocyanate include acid azide, compounds having urethane linkage, and compounds having urea linkage. For example, phenol block of diphenylmethane, etc.

The adhesion in accordance with this embodiment of the invention can be practiced by various ways such as applying the adhesive substance containing benzoyloxyalkyl radical or ring-substituted benzoyloxyalkyl radical as a side chain to the fiber and the said assistant, to rubber, and putting the two together at the time of adhesion; or reversely applying the adhesive substance to rubber and the assistant to fiber and adhering the two. Or, the adhesive substance and the assistant may be mixed so far as the two do not cause a particularly undesirable reaction. Among the above, the first-mentioned method gives the most favorable result in the strength test of adhesive, while the rest also give sufficiently strong adhesion. It should be apparent to those who are skilled in the art that still varied methods may be employed besides the above-mentioned. In order to apply the adhesive substance or the assistant onto fiber or rubber, they may be dissolved or dispersed in solvent, water, etc. and such conventional means as dipping, daubing and spraying, etc. can be employed. The appropriate quantity of the assistant for use is 1–20 wt. percent to the adhesive substance.

In any of the above-described methods, the adhesion is completed by heating the materials to be adhered, while pressing them to each other. The pressure varies depending on the type of the materials, but normally up to 0.5 kg./cm.$^2$ is sufficient. The heating at 50–200° C. for 2–40 minutes is normally sufficient, a relatively high temperature condition for a longer time within the above range being chosen for adhering rubber to be vulcanized.

In order to explain the content of the present invention in still greater detail, working examples are given hereinbelow, in which the intrinsic viscosity [$\eta$] of the polymer is the value measured with respect to the solution of the same in acetone or toluene at 30° C.; the peel strength (kg./cm.) is the value obtained by subjecting 1 cm. x 10 cm. sample piece to Schopper's tensile tester at 25° C. with the pull rate of 20 cm./min. at the peel angle 90°; and the interfacial shear strength (kg./cm.$^2$) is the value obtained by subjecting 1 cm. x 2 cm. sample area adhered with the binder to the same tester with the pull rate of 50 cm./min. Again in some of the examples the strength test of adhesive of rubber-reinforcing fiber with rubber was performed which was the pull test (H-test) of fiber performed at the pull rate of 50 cm./min., and the result is expressed with the unit of kg./10 mm. (Concerning the H-test, a full explanation is given in India Rubber World., vol. 114, May 1946, p. 213.) Unless otherwise specified, the rubber used in some of the examples as the material to be adhered is styrene-butadiene rubber which was vulcanized at 140° C. for 30 minutes. And, the composition of the unvulcanized rubber blend sheets of natural rubber and styrene-butadiene rubber is as follows:

Natural rubber:

| | Parts |
|---|---|
| RSS #1 | 100 |
| Zinc oxide | 5 |
| Soluble sulfur | 2.5 |
| Stearic acid | 2 |
| Asahi #60 | 35 |
| Pine-tar | 3 |
| Nocrac D | 0.5 |
| Nocceler DM | 0.7 |

Styrene-butadiene rubber:

| | |
|---|---|
| Nippol 1500 | 100 |
| Zinc oxide | 5 |
| Sulfur | 1.8 |
| Stearic acid | 3 |
| Asahi #60 | 50 |
| Georex #1 | 5 |
| Nocrac D | 1 |
| Nocceler CZ | 1 |

In the above composition,

RSS #1 is ribbed smoked sheet

Asahi #60 is carbon black produced by Asahi Carbon Mfg. Co. Ltd.

Nocrac D is phenyl β-naphthylamine produced by Ouchishinko Chemical Co., Ltd.

Nocceler DM is dibenzothiazyldisulfide produced by Ouchishinko Chemical Co., Ltd.

Nippol 1500 is styrene-butadiene rubber produced by The Japanese Geon Co., Ltd.

Georex #1 is high aromatic oil produced by Nippon Petroleum Refining Co., Ltd. and Nocceler CZ is N-cyclohexyl-2-benzothiazole sulfenamide produced by Ouchishinko Chemical Co., Ltd.

Example 1

2-benzoyloxyethyl acrylate together with 0.3 wt. percent thereof of azobisisobutyronitrile was subjected to block polymerization at 60° C. for 3 hours to produce a viscous, transparent polymer. The intrinsic viscosity [$\eta$] of the polymer was 0.29. The same was made into 15% benzene solution and applied onto the polyethylene terephthalate film surface to be adhered. After the subsequent pre-drying at 60° C. for 20 minutes the same was adhered to another piece of polyethylene terephthalate film similarly treated. When the film pieces were subjected to a heat treatment of 100° C. for 20 minutes under pressure of 0.5 kg./cm.$^2$, they showed a peel strength of 2.1 kg./cm. and a shear strength of 18.5 kg./cm.$^2$ For comparison, poly 2-benzoyloxyethyl acrylate was replaced by polymethyl acrylate and polybutyl acrylate prepared in the similar manner, and their strength of adhesion of the same film pieces was tested, with the result of peel strength ranging only 0.2–0.4 kg./cm., and shear strength ranging 3–4 kg./cm.$^2$.

Example 2

The adhesion tests in entirely the same manner as in Example 1 were run except that one of the materials to be adhered was varied other than polyethylene terephthalate film. The results are shown in Table 1 below.

TABLE 1

| Materials to be adhered | Peel strength (kg./cm.) | Shear strength (kg./cm.$^2$) |
|---|---|---|
| Polyethylene terephthalate film-polyhexamethylene adipamide film | 1.4 | 13.1 |
| Polyethylene terephthalate film-polystyrene resin | 1.6 | 13.5 |
| Polyethylene terephthalate film-polycarbonate resin | 1.8 | 12.0 |
| Polyethylene terephthalate film-polyphenylene oxide resin | 2.3 | 18.5 |
| Polyethylene terephthalate film-polymethacrylate resin | 2.2 | 22.0 |
| Polyethylene terephthalate film-diallyl phthalate resin | 1.8 | 16.5 |
| Polyethylene terephthalate film-melamine formaldehyde resin | 1.9 | 14.0 |
| Polyethylene terephthalate film-phenol-formaldehyde resin | 2.0 | 18.5 |
| Polyethylene terephthalate film-urea-formaldehyde resin | 1.5 | 14.5 |
| Polyethylene terephthalate film-aluminum foil | 2.0 | 19.2 |
| Polyethylene terephthalate film-stainless steel | 1.9 | 11.0 |
| Polyethylene terephthalate film-glass sheet | 1.9 | 16.0 |
| Polyethylene terephthalate film-leather | 2.1 | 12.0 |
| Polyethylene terephthalate film-wooden sheet | 2.3 | 16.5 |
| Polyethylene terephthalate film-vulcanized natural rubber sheet | 1.3 | 12.4 |

Example 3

Tests were run in entirely the same manner as in Example 1 except that as the adhesive substance, copolymers of 2-benzoyloxyethyl acrylate with other monomers were used in place of the homopolymer of 2-benzoyloxyethyl acrylate. The results are shown in Table 2 below.

TABLE 2

| Composition of adhesive copolymer (mol percent) | Intrinsic viscosity of polymer [η] | Peel strength (kg./cm.) | Shear strength (kg./cm.$^2$) |
|---|---|---|---|
| (1) 2-benzoyloxyethyl acrylate (70), vinyl acetate (30) | 0.39 | 2.0 | 18.7 |
| (2) 2-benzoyloxyethyl acrylate (50), vinyl acetate (50) | 0.35 | 1.6 | 17.0 |
| (3) 2-benzoyloxyethyl acrylate (70), acrylonitrile (30) | 0.51 | 1.0 | 13.7 |
| (4) 2-benzoyloxyethyl acrylate (70), styrene (30) | 0.28 | 1.6 | 17.0 |
| (5) 2-benzoyloxyethyl acrylate (70), vinyl benzoate (30) | 0.42 | 2.0 | 16.5 |
| (6) 2-benzoyloxyethyl acrylate (50), methyl acrylate (50) | 0.45 | 1.9 | 16.8 |
| (7) 2-benzoyloxyethyl acrylate (90), acrylic acid (10) | 0.30 | 2.1 | 14.6 |
| (8) 2-benzoyloxyethyl acrylate (90), N-methylolacrylamide[1] (10) | 0.29 | 2.0 | 16.8 |
| (9) 2-benzoyloxyethyl acrylate (50), styrene (30), acrylic acid (20) | 0.30 | 2.5 | 18.0 |

[1] In place of N-methylolacrylamide, N-butoxymethylacrylamide or N-acetoxymethylacrylamide was used with substantially the same result.

Example 4

4-benzoyloxybutyl acrylate was dissolved in an equivalent amount of benzene and polymerized at 60° C. for 4 hours in the presence of 0.3 wt. percent of azobisisobutyronitrile. The polymer was precipitated with addition of methanol and recovered as the polymer having intrinsic viscosity [η] of 0.30, which was used to bind polyethylene terephthalate film samples mutually, by the same means as employed in Example 1. The strength test of the adhesive gave the result of a peel strength of 2.2 kg./cm. and a shear strength of 14.4 kg./cm.$^2$.

When the 4-benzoyloxybutyl acrylate homopolymer was replaced by 4-benzoyloxybutyl acrylate (70 mol percent)-styrene (30 mol percent) copolymers, the intrinsic viscosity of the polymer was 0.41, the peel strength was 1.3 kg./cm. and the shear strength was 17.4 kg./cm.$^2$.

Under the same conditions, 3-benzoyloxypropyl acrylate was used in place of 4-benzoyloxybutyl acrylate to produce substantially the same result.

Example 5

Example 1 was repeated except that the 2-benzoyloxyethyl acrylate was replaced by 2-(p-methoxybenzoyloxy) ethyl acrylate. The intrinsic viscosity of the polymer was 0.30. The product's binding ability of two polyethylene terephthalate film samples was tested. As the result, the peel strength was 1.5 kg./cm. and the shear strength was 18.8 kg./cm.$^2$.

Example 6

Example 1 was repeated except that the 2-benzoyloxyethyl acrylate was replaced by 2-(p-chlorobenzoyloxy) ethyl acrylate. The intrinsic viscosity of the polymer was 0.33. The product's binding ability of two polyethylene terephthalate film samples was tested. As the result, the peel strength was 2.0 kg./cm., and the shear strength was 18.0 kg./cm.$^2$.

Example 7

In entirely the same manner as in Examples 1 and 2, adhesion tests of two polyhexamethylene adipamide film samples were performed by replacing polyethylene terephthalate film by polyhexamethylene adipamide film. The results are shown in Table 3.

TABLE 3

| Composition of adhesive polymer (mol percent) | Intrinsic viscosity of polymer [η] | Peel strength (kg./cm.) | Shear strength (kg./cm.$^2$) |
|---|---|---|---|
| (1) 2-benzoyloxyethyl acrylate (100) | 0.29 | 1.3 | 9.0 |
| (2) 2-benzoyloxyethyl acrylate (70), vinyl benzoate (30) | 0.42 | 1.1 | 11.9 |
| (3) 2-benzoyloxyethyl acrylate (90), acrylic acid (10) | 0.30 | 1.5 | 13.4 |
| (4) 2-benzoyloxyethyl acrylate (70), vinyl acetate (30) | 0.39 | 1.4 | 12.0 |
| (5) 2-benzoyloxyethyl acrylate (50), styrene (30), acrylic acid (20) | 0.41 | 1.8 | 13.0 |

Example 8

5 g. of cis-1,4-polybutadiene rubber was dissolved in 100 g. of benzene, and to the solution 9 g. of 2-hydroxyethyl benzoate and 0.05 g. of paratoluenesulfonic acid as a catalyst was added, followed by further addition of 6 g. of tertiary butylhypochlorite dissolved in 30 g. of benzene at a slow rate at room temperature, with sufficient stirring. After subsequent 5 hours' stirring at room temperature, the reaction mixture was poured into methanol to solidify the rubber component. Separating the rubber component, the adhesive sample A was obtained, in which 25% of the double bond within the starting cis-1,4-polybutadiene rubber reacted with 2-hydroxyethyl benzoate. The intrinsic viscosity of the product was 2.10.

Likewise, by reacting 5 g. of styrene-butadiene rubber of styrene content 23.5% with 3 g. of 2-hydroxyethyl benzoate and 2 g. of tertiary butylhypochlorite under the similar conditions as described in the above, the adhesive sample B was obtained, in which 20% of the double bond within the starting styrene-butadiene rubber reacted with 2-hydroxyethyl benzoate. The intrinsic viscosity of the product was 2.02.

ene terephthalate film with the rubber was tested. The results were as shown in Table 4.

TABLE 4

| Mixing Ratio of Adhesive Polymer (part by weight) | Material adhered with polyethylene terephthalate | Peel strength (kg./cm.) | Shear strength (kg./cm.$^2$) |
|---|---|---|---|
| Adhesive sample C (1) <br> Adhesive sample E (3) | Natural rubber | 5.7 | 14.8 |
| Adhesive sample C (3) <br> Adhesive sample E (1) | Styrene-butadiene Rubber | 5.8 | 14.6 |
| Adhesive sample D (3) <br> Adhesive sample E (1) | Natural rubber | 4.4 | 10.8 |
| Adhesive sample D (3) <br> Adhesive sample E (1) | Styrene-butadiene Rubber | 8.2 | 13.4 |

Each of the samples A and B was made into 10 wt. percent benzene solution, to which was added 10 wt. percent to the adhesive sample of benzoyl peroxide and dissolved. Thus prepared solutions were each applied to the surface of the polyethylene terephthalate film sample to be adhered and air-dried to be removed of the solvent. Thereafter the film samples were stuck together with similarly treated other polyethylene terephthalate film samples, and heated at 150° C. for 5 minutes under pressure of 0.5 kg./cm.$^2$. The test results showed that the adhesive A had a peel strength of 2.3 kg./cm. and a shear strength of 5.3 kg./cm.$^2$, and that the adhesive B, a peel strength of 2.3 kg./cm. and a shear strength of 4.3 kg./cm.$^2$.

For comparison, the starting materials, i.e. cis-1,4-polybutadiene rubber or styrene-butadiene rubber, were used in place of the adhesives A and B and subjected to the same strength test, showing peel strength of respectively only 0.5 kg./cm. and 0.9 kg./cm.

Example 9

In exactly the same manner of preparation of the adhesive A of Example 8, an adhesive substance which is the reaction product of 2-hydroxyethyl benzoate with 35% of the double bond in cis-1,4-polybutadiene rubber was prepared, except that 12 g. of 2-hydroxyethyl benzoate and 8 g. of tertiary butylhypochlorite were used. The intrinsic viscosity of the product was 2.12. The said product was used to bind polyhexamethylene adipamide film samples, and subjected to the same strength test as in Example 8, showing the peel strength of 2.4 kg./cm. For comparison, the starting material, cis-1,4-polybutadiene rubber, was used as the binder and its adhesive strength was tested in the same manner. The peel strength thereby determined was only 0.6 kg./cm.

Example 10

The adhesive substance obtained in Example 9 was made the adhesive sample C. Also an adhesive D was prepared by entirely the same method for preparing the adhesive A of Example 8 except that 5 g. of styrene-butadiene rubber of a styrene content 23.5% was reacted with 2.2 g. of 2-hydroxyethyl benzoate and 1.4 g. of tertiary butylhypochlorite, the said sample D being the reaction product in which 2-hydroxyethyl benzoate reacted with 15% of the double bond within the starting rubber.

2-benzoyloxyethyl acrylate homopolymer (the adhesive sample E) used in Example 1 was mixed with each of the samples C and D, and the mixtures were made into each 15 wt. percent benzene solution, which was each applied onto the surface of polyethylene terephthalate film sample and that of the sheet composed of unvulcanized rubber composition. The solvent was removed by air-drying, and the adhesive-applied surface were stuck together. After vulcanization thereof at 150° C. for 40 minutes under pressure of 0.5 kg./cm.$^2$ exerted by a pressing machine, the adhesion strength of the polyethylene terephthalate film with the rubber was tested. The results were as shown in Table 4.

Example 11

Under the same conditions for the preparation of the adhesive A of Example 8 except that 2.5 g. of tertiary butylhypochlorite and 7 g. of 2-benzoyloxyethyl monophthalate in place of 9 g. of 2-hydroxyethyl benzoate were used, an adhesive sample F was prepared in which 15% of the double bond within the starting rubber was reacted. The intrinsic viscosity of the product was 2.12.

Again under the same conditions for the preparation of the adhesive A of Example 8 except that 4.3 g. of tertiary butylhypochlorite and 11 g. of 2-(ortho-benzoylbenzoyloxy)ethanol in place of 9 g. of 2-hydroxyethyl benzoate were used, an adhesive sample G was prepared in which 12% of the double bond within the starting rubber was reacted. The intrinsic viscosity of the product was 2.12.

Using the said samples F and G, adhesion test of polyethylene terephthalate film samples was run in the manner described in Example 6. In case of the adhesive F, the peel strength was 1.8 kg./cm. and the shear strength, 4.1 kg./cm.$^2$. With the adhesive G, the peel strength was 1.5 kg./cm. and the shear strength, 4.2 kg./cm.$^2$.

Examples 12–16

Into 15 wt. percent benzene solution of the copolymer composed of 90 mol percent of 2-benzoyloxyethyl acrylate and 10 mol percent of N-methylolacrylamide prepared in Example 3, various tire cords shown in Table 5 were immersed, and dried at 80° C. for 30 minutes after withdrawal.

Separately, a 10 wt. percent acetone solution of N-bromosuccinimide was applied to the surface of unvulcanized rubber composition sheet, which was then dried for 30 minutes at room temperature.

The results of H-test performed with thus treated tire cords and the rubber sheet are shown as Examples 12–16 in Table 5. With the view to establish the effect of N-bromosuccinimide used as the halogenating agent, the results of repeating Examples 12–16 with omission of the same are also shown as controls.

TABLE 5

| Tire Cord | Results of H-test | |
|---|---|---|
| | Example | Control |
| Example: | | |
| 12 ........ Polyethylene terephthalate | 7.8 | 3.5 |
| 13 ........ Polyhexamethylene adipamide | 8.0 | 3.3 |
| 14 ........ HT-1 (polyamide) [1] | 8.8 | 4.3 |
| 15 ........ N-44G (polyamide) [2] | 7.0 | 3.5 |
| 16 ........ Rayon | 8.8 | 4.0 |

[1] HT-1 is polyphenylenediamine isophthalate fiber produced by Du Pont.
[2] N-44G is polyamide fiber produced by Du Pont (Exact Structure is not disclosed).

Examples 17–21

The tire cords treated and dried in the manner described in Examples 12–16 were immersed in a benzene solution concurrently containing 15 wt. percent of the aforesaid unvulcanized rubber composition of styrene-butadiene rubber and 10 wt. percent of tolylenediisocyanate, and after withdrawal therefrom, dried at 100° C. for 15 minutes.

The results of H-test using thus pre-treated tire cords are shown in Table 6 as Examples 17–21. With the view of establish the effect of diisocyanate, the results of repeating Examples 17–21 with omission of the same are also shown as controls.

TABLE 6

| Tire Cord | Results of H-test | |
|---|---|---|
| | Example | Control |
| Example: | | |
| 17 ........ Polyethylene terephthalate ........ | 11.2 | 3.2 |
| 18 ........ Polyhexamethylene adipamide .. | 9.6 | 3.5 |
| 19 ........ HT-1 (polyamide) .............. | 11.4 | 3.8 |
| 20 ........ N-44G (polyamide) ............. | 9.6 | 3.7 |
| 21 ........ Rayon ......................... | ¹ above 11.0 | 4.1 |

¹ Cord breakage.

When the 2-benzoyloxyethyl acrylate of Example 17 was replaced each time by 4-benzoyloxybutyl acrylate, 2-(p-methoxybenzoyloxy)ethyl acrylate or 2-(p-chlorobenzoyloxy)ethyl acrylate, the H-test results were, respectively, 10.8, 10.0 and 10.7.

Examples 22–25

Into a 15 wt. percent benzene solution of the copolymer composed of 50 mol percent of 2-benzoyloxyethyl acrylate, 30 mol percent of styrene and 20 mol percent of acrylic acid as prepared in Example 3, polyethylene terephthalate tire cords were immersed and after withdrawal therefrom, dried at 80° C. for 30 minutes.

Separately, to the surface of unvulcanized rubber blend sheet, each type of the treating liquids shown in Table 7 was applied and dried for 30 minutes at room temperature.

The results of H-test performed with thus treated polyethylene terephthalate tire cords and rubber sheets are shown in Table 7 as Examples 22–25. In order to establish the effect of the halogenating agents employed, the result of the control test in which none of those agents was used is also shown.

used to treat the tire cord, the results obtained were substantially the same as in Table 7.

Example 26

When H-test was run with the sample treated in exactly the same manner as in Examples 22–25 except that in place of the organic solvent solutions of halogenating agents or chloroprene, a 10 wt. percent acetone solution of diphenylmethanediisocyanate was used. The result was 10.7. Again, 10 wt. percent of diphenylmethanediisocyanate was dissolved in the 15 wt. percent benzene solution of the adhesive polymer and the resultant solution was used for surface treatment of polyethylene terephthalate tire cord. When the cord was adhered with the rubber sheet which received no pre-treatment and subjected to H-test, the result was 10.5.

When diphenylmethanediisocyanate was replaced by phenol block of diphenylmethanediisocyanate (Hylene MP produced by Du Pont) in the above two cases, substantially the same results were obtained.

Examples 27–30

Adhesion strength for polyethylene terephthalate tire cord was tested in exactly the same manner as in Example 12, except that the mixture of 90 mol percent of 2-benzoyloxyethyl acrylate and 10 mol percent of N-methylolacrylamide used to form the copolymer was replaced each time by the mixture of the composition shown in Table 8.

The results are shown in Table 8, as Examples 27–30. In order to establish the effect of N-bromosuccinimide as the halogenating agent, the results of repeating the said examples with omission of the same are also shown as controls.

TABLE 8

| Composition of Polymer Material (mol percent) | H-test result | |
|---|---|---|
| | Example | Control |
| Example: | | |
| 27 .............. 2-benzoyloxyethyl acrylate (50), acrylic acid (50) .......................................... | 9.5 | 4.5 |
| 28 .............. 2-benzoyloxyethyl acrylate (30), styrene (50), acrylic acid (20) ........................ | 8.0 | 5.0 |
| 29 .............. 2-benzoyloxyethyl acrylate (20), methyl acrylate (30), acrylic acid (50) ................ | 8.0 | 2.5 |
| 30 .............. 2-benzoyloxyethyl acrylate (30), styrene (30), methyl acrylate (30), acrylic acid (10) .... | 10.4 | 4.0 |

Examples 31–36

Adhesion strength for polyethylene terephthalate tire cord was tested in exactly the same manner as in Example 17, except that the mixture of the composition as shown

TABLE 7

| Example: | Treating Liquid | H-test result |
|---|---|---|
| 22 ................. | Carbon tetrachloride solution of chloride (about 3 wt. percent) ............ | 8.0 |
| 23 ................. | Acetone solution of t-butylhypochloride (10 wt. percent) ................. | 8.2 |
| 24 ................. | Acetone solution of trichloromethanesulfonyl cholride (10 wt. percent) .... | 6.0 |
| 25 ................. | Acetone solution of chloroprene (10 wt. percent) ........................ | 7.8 |
| Control ............. | None ................................................................ | .40 |

When the chlorine in Example 22 was replaced each time by bromine and iodine, the test results in both cases were substantially the same to that of Example 22 above. Again when t-butylhypochlorite, trichloromethanesulfonyl chloride and chloroprene used respectively in Examples 23, 24 and 25 were each dissolved in the said benzene solution of the adhesive polymer used for the surface treatment of the polyethylene terephthalate tire cord in an amount of 10 wt. percent, and the resultant solutions were in Table 9 was used in each of the examples as the starting material for the adhesive polymer, in place of the mixture composed of 90 mol percent of 2-benzoyloxyethyl acrylate and 10 mol percent of N-methylolacrylamide. The results are shown in Table 9, as Examples 31–33. Also the results of using diphenylmethanediisocyanate as the adhesion assistant, in place of tolylenediisocyanate used in Example 17, in each of the above examples are shown in the same table as Examples 34–36.

TABLE 9

| Composition of Polymer Material (mol percent) | H-test result With tolylene diisocyanate | H-test result With diphenylmethanediisocyanate |
|---|---|---|
| Example: | | |
| 31 and 34...... 2-benzoyloxyethyl acrylate (50), acrylic acid (50)............. | 8.2 | 10.2 |
| 32 and 35...... 2-benzoyloxyethyl acrylate (50), styrene (30), acrylic acid (20)... | 12.0 | 10.7 |
| 33 and 36...... 2-benzoyloxyethyl acrylate (30), styrene (50), acrylic acid (20)... | 9.3 | 8.0 |

Examples 37–41

By reacting 5 g. of cis-1,4-polybutadiene rubber with 16 g. of 2-hydroxyethyl benzoate and 11 g. of tertiary butylhypochlorite under exactly the same conditions as employed in Example 8, an adhesive high molecular substance (adhesive sample H) was obtained in which 45% of the double bond within the starting cis-1,4-polybutadiene rubber reacted with 2-hydroxyethyl benzoate.

Strength test of adhesive was run in the same manner as described in Examples 17–21 except that the adhesive A of Example 8 and the above-mentioned adhesive H were used in place of the adhesive high molecular substance obtained by copolymerization of 2-benzoyloxy-ethyl acrylate and N-methylolacrylamide. The results are shown in Table 10 as Examples 37–41. Furthermore in the purpose of establishing the effect of tolylenediisocyanate as the adhesion assistant, the results of repeating the same examples with omission of tolylenediisocyanate are also given as the controls.

TABLE 10

| | Adhesive | Tire Cord | H-test result Example | H-test result Control |
|---|---|---|---|---|
| Example: | | | | |
| 37............... | A | Polyethylene terephthalate...... | 8.4 | 5.4 |
| 38............... | H | .....do.................... | 9.0 | 6.0 |
| 39............... | H | Polyhexamethylene adipamide... | 8.8 | |
| 40............... | H | HT-1 (polyamide).............. | 9.4 | |
| 41............... | H | N-44G (polyamide)............. | 10.0 | |

Example 42

When the 2-benzoyloxyethyl acrylate in the adhesive high molecular substance composed of the copolymer made from 50 mol percent of 2-benzoyloxyethyl acrylate and 50 mol percent of acrylic acid used in Examples 27 and 31 was replaced by styrene and otherwise the said examples were repeated the H-test results were only 5.5–6.5. Therefore it is apparent that the adhesion effect exhibited in Examples 27 and 31 is not attributable to the use of N-bromosuccinimide or tolylenediisocyanate as the adhesion assistant alone.

Similarly, when a high molecular substance obtained through radical block polymerization of 45 mol percent of styrene, 45 mol percent of methyl acrylate and 10 mol percent of acrylic acid was used in place of the adhesive high molecular substance used in Examples 12 and 17, the test results also showed the values around 5.5–6.5. Accordingly, the synergistic effect of the adhesive having 2-benzoyloxyalkyl radical and the halogenating agent or isocyanate is thereby reaffirmed.

We claim:

1. Method of adhesion in which at least one of the two materials to be adhered to each other is selected from the group consisting of polyester, polyamide and cellulose materials, characterized in that a high molecular substance containing as a side chain a radical represented by the general formula

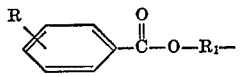

(wherein R is a member of the group consisting of hydrogen atom, halogen atom, alkyl group, alkoxy group, cyano group and nitro group, and $R_1$ is an alkylene radical of no less than 2 carbon atoms, which may be substituted by an alkyl radical) as the binder is applied onto the surfaces to be adhered.

2. The method of claim 1 in which the high molecular substance is a polymer comprising benzoyloxyalkyl acrylate as the recurring unit.

3. The method of claim 1 in which the high molecular substance is a polymer comprising benzoyloxyalkylvinyl ether as the recurring unit.

4. The method of claim 1 in which at least one of the materials to be adhered is a polyethylene terephthalate material.

5. The method of claim 4 in which the polyethylene terephthalate material is polyethylene terephthalate film.

6. Method of adhesion in which one of the two materials to be adhered to each other is selected from the group consisting of polyester, polyamide and cellulose materials and the other is rubber materials, characterized in that a high moelcular substance containing as a side chain a radical represented by the general formula

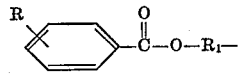

(wherein R is a member of the group consisting of hydrogen atom, halogen atom, alkyl group, alkoxy group, cyano group and nitro group, and $R_1$ is an alkylene radical of no less than 2 carbon atoms, which may be substituted by an alkyl radical) as the binder is applied onto the surfaces to be adhered, together with a substance selected from the group consisting of halogen, compounds which release halogen when heated, halogen-containing polymerizable monomers and isocyanates as an assistant.

7. Method of adhesion in which a fiber selected from the group consisting of polyethylene terephthalate, polyhexamethylene adipamide and cellulosic fibers is adhered to rubber material, characterized in that a high molecular substance containing as a side chain a radical represented by the general formula

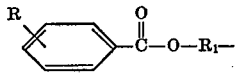

(wherein R is a member of the group consisting of hydrogen atom, halogen atom, alkyl group, alkoxy group, cyano group and nitro group, and $R_1$ is an alkylene radical of no less than 2 carbon atoms, which may be substituted by an alkyl radical) as the binder is applied onto the surfaces to be adhered, together with a substance selected from the group consisting of halogen, compounds which release halogen when heated, halogen-containing polymerizable monomers and isocyanates as an assistant.

8. The method of claim 7 in which the binder is applied onto the surface to be adhered of the fiber and the assistant, onto the surface to be adhered of the rubber material.

9. The method of claim 7 in which the binder is applied onto the surface to be adhered of the rubber material and the assistant, onto the surface to be adhered of the fiber.

10. The method of claim 7 in which a mixture of the binder with the assistant is applied onto the surfaces to be adhered.

References Cited

UNITED STATES PATENTS

| | | | |
|---|---|---|---|
| 2,968,587 | 1/1961 | Baldwin et al. | 156—333 X |
| 3,113,907 | 12/1963 | Tocker | 117—161 X |
| 3,167,583 | 1/1965 | Goldberg et al. | 260—89.5 X |
| 3,196,035 | 7/1965 | Yanagihara et al. | 161—231 X |

EARL M. BERGERT, *Primary Examiner.*

R. A. KILLWORTH, *Assistant Examiner.*

U.S. Cl. X.R.

117—161; 156—331, 332, 333; 161—227, 231; 260—86.1, 89.5